(12) United States Patent
Sandberg

(10) Patent No.: US 7,547,341 B2
(45) Date of Patent: Jun. 16, 2009

(54) EQUIPMENT AIR FILTER ASSEMBLY

(76) Inventor: Leslye Sandberg, 20884 No. Exmoor Ave., Barrington, IL (US) 60010

( * ) Notice: Subject to any disclaimer, the term of this patent is extended or adjusted under 35 U.S.C. 154(b) by 0 days.

(21) Appl. No.: 12/018,355

(22) Filed: Jan. 23, 2008

(65) Prior Publication Data

US 2008/0115475 A1    May 22, 2008

Related U.S. Application Data

(63) Continuation of application No. 11/082,102, filed on Mar. 16, 2005, now Pat. No. 7,332,011.

(51) Int. Cl.
*B01D 46/00* (2006.01)

(52) U.S. Cl. .............. 55/496; 55/491; 55/500; 55/507; 55/509; 55/528; 62/259.1; 62/507

(58) Field of Classification Search ........... 55/495, 55/496, 500, 507, 511, 527; 62/259.1, 507
See application file for complete search history.

(56) References Cited

U.S. PATENT DOCUMENTS

| | | |
|---|---|---|
| 2,705,990 A | 4/1955 | Miller |
| 4,035,164 A | 7/1977 | Taylor |
| 4,340,115 A | 7/1982 | Wright et al. |
| 4,477,272 A | 10/1984 | Hollis et al. |
| 4,765,915 A | 8/1988 | Diehl |
| 5,131,463 A | 7/1992 | Zimmerli et al. |
| 5,312,467 A | 5/1994 | Wolfe |
| 5,669,183 A | 9/1997 | Frentress |
| 5,809,800 A | 9/1998 | Deal |
| 5,993,501 A | 11/1999 | Cusick et al. |
| 6,036,739 A | 3/2000 | New, Sr. |
| 6,149,702 A | 11/2000 | Kawano et al. |
| 6,221,120 B1 | 4/2001 | Bennington et al. |
| 6,315,806 B1 | 11/2001 | Torobin et al. |
| 6,418,974 B1 | 7/2002 | King |
| 6,430,954 B1 | 8/2002 | Smith |
| 6,514,324 B1 | 2/2003 | Chapman |
| 6,708,514 B1 | 3/2004 | Miller |
| 6,793,715 B1 | 9/2004 | Sandberg |
| 7,140,194 B1 | 11/2006 | Miller |
| 7,387,654 B1 * | 6/2008 | Byers .................. 55/385.1 |

OTHER PUBLICATIONS

Air Solution Company, "Air Intake Filters With The New Turn Stud Fastener!", www.airsolutioncompany.com/turnstud.asp (accessed Feb. 24, 2005).

(Continued)

*Primary Examiner*—Duane Smith
*Assistant Examiner*—Robert A Clemente
(74) *Attorney, Agent, or Firm*—Michael Best & Friedrich LLP

(57) ABSTRACT

A filter assembly for a structure having an air intake, the filter assembly including a filter media that is sized and shaped to cover the air intake. The ends of the filter media are connected by an elastic fastener, such that the filter media and the fastener encircle the structure and are under tension to hold the filter assembly on the structure. The filter media is a web of synthetic fibers, such as a web of fibers woven in a 3-dimensional pattern or a nonwoven mesh.

17 Claims, 5 Drawing Sheets

OTHER PUBLICATIONS

Air Solution Company, "Central Air Condenser Coil Filters", www.airsolutioncompany.coim/residential.asp (accessed Feb. 24, 2005).

Air Solution Company, "Frequently Asked Questions", www.airsolutioncompany.com/faqs.asp (accessed Feb. 24, 2005).

* cited by examiner

EQUIPMENT AIR FILTER ASSEMBLY

CROSS REFERENCE TO RELATED APPLICATIONS

This application is a continuation of U.S. patent application Ser. No. 11/082,102, filed Mar. 16, 2005.

BACKGROUND OF THE INVENTION

The present invention relates to filtration systems for equipment having air intakes and, in particular, to filter assemblies that are adjustable for use with equipment of different size and shape.

Many types of equipment require air circulation and cooling for proper operation, such as air conditioning and refrigeration systems. Such equipment typically involves cooling fins and coils, and other components that can become coated or obstructed by airborne particles, and which require repeated cleaning and maintenance. For example, outdoor heat exchangers for air conditioning systems operate by forcing air across numerous narrowly spaced fin-coils. These fin-coils can become blocked or coated by airborne dirt and debris, which decreases the air flow to the equipment, reduces the efficiency and life expectancy of the heat exchanger and makes the equipment more expensive to operate. Furthermore, in coastal areas, the humidity and salt can cause severe corrosion of the equipment.

The damage caused by airborne particles and debris is typically prevented by attaching a filter to the air intake of the equipment. However, the filter itself can restrict the air flow to the equipment, thereby creating the same problem it was intended to solve. In addition, such filters must be produced in numerous sizes and shapes to accommodate the wide variety of different air conditioning and refrigeration systems, as well as other equipment. The need to produce a different model of filter for each type of equipment increases manufacturing costs and requires retailers to stock numerous different filters. Installing the filter on the air intake often requires modification of the equipment by attaching clips, hook and loop strips, bolts or other devices to mount the filter. Modifying the equipment and mounting the filter may also require the user to have one or more tools. Moreover, such filters typically do nothing to prevent corrosion due to humidity and salt. Thus, there is a need for a filter assembly with a low resistance to air flow, that may be adapted for use with different sizes and shapes of equipment and is easily installed without the need to modify the equipment or the need to use any tools. Furthermore, there is a need for a filter assembly that protects the equipment from corrosion due to humidity and salt.

BRIEF SUMMARY OF THE INVENTION

These needs and other needs are satisfied by the present invention, which comprises a filter assembly for a structure having an air intake, the filter assembly including a filter media that is sized and shaped to cover the air intake and that has first and second ends. A fastener connects the first and second ends of the filter media, such that the filter media and the fastener together encircle or surround the structure.

In a preferred embodiment, the fastener is an elastic cord having first and second ends, with a connector at each end for attaching the fastener to the first and second ends of the filter media, such that the filter media and the fastener are under tension to hold the filter assembly on the structure. It is further preferred that the filter media is a web of synthetic fibers, such as a web of fibers woven in a 3-dimensional pattern or a nonwoven mesh.

DETAILED DESCRIPTION OF THE INVENTION

Figure 1:
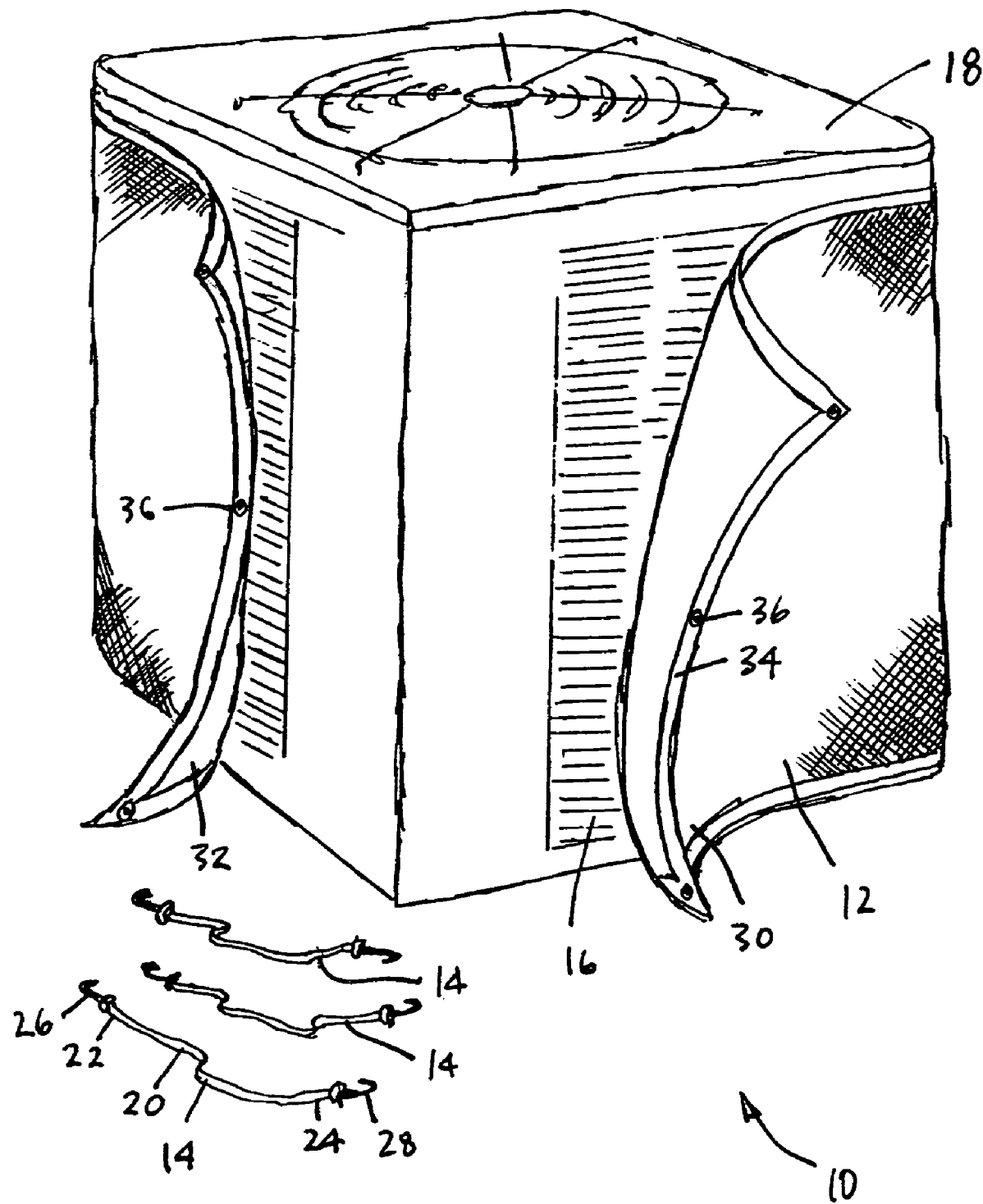
FIG. 1 shows a perspective view of a filter assembly partially installed on a heat exchanger for an air conditioning system.
Figure 2:
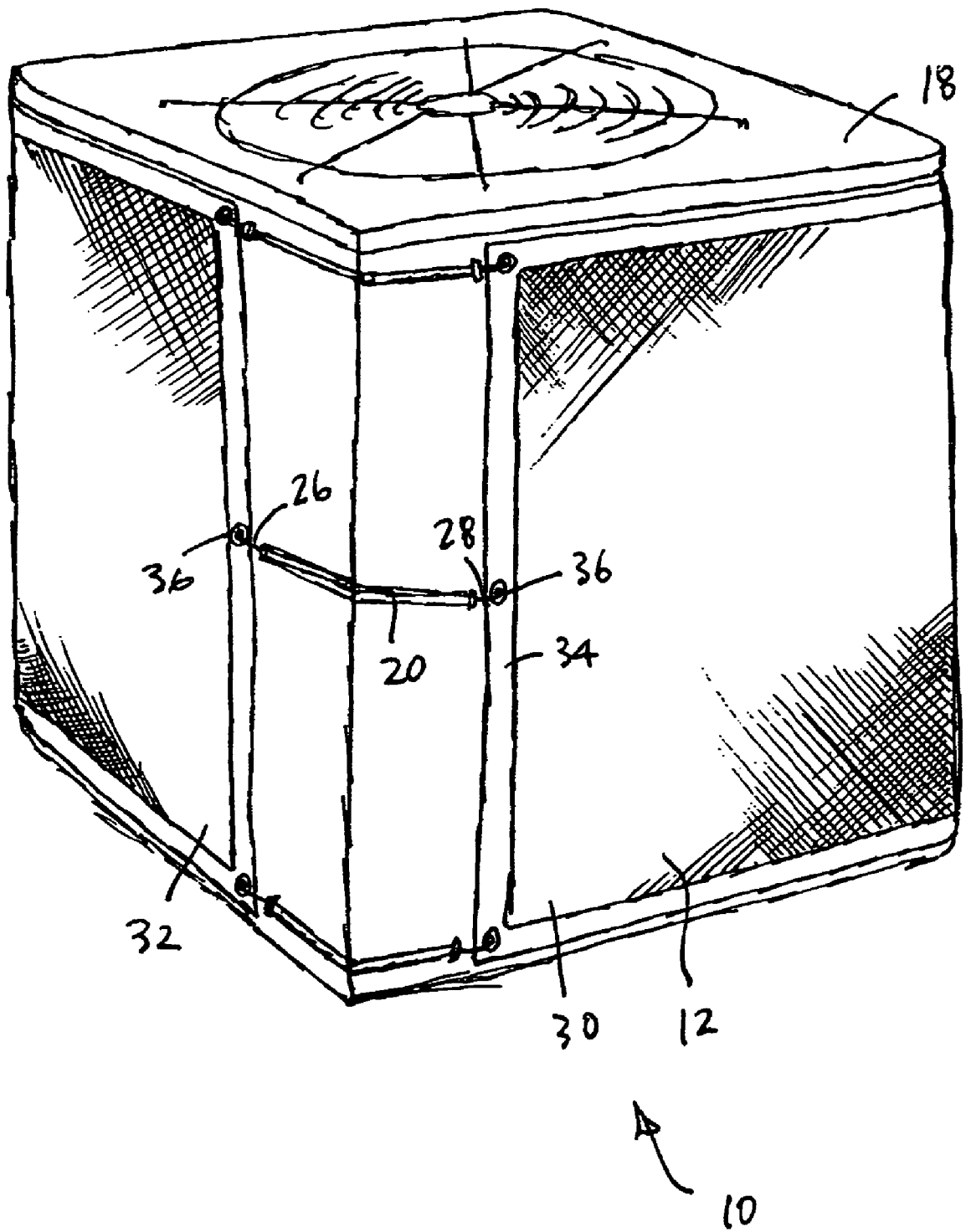
FIG. 2 shows the completed installation of the filter assembly of FIG. 1.

Referring to FIGS. 1 and 2, a filter assembly 10 is shown comprising a filter media 12 and fasteners 14. Filter media 12 is a screen, netting or other particle filtration media that is sized to at least cover the air intake 16 of a structure 18, such as an outdoor heat exchanger for a residential air conditioning system. Fastener 14 comprises an elastic cord 20, such as a bungee cord. The ends 22, 24 of cord 20 are provided with connectors for attaching cord 20 directly to filter media 12, such as hooks 26, 28 that are sized and shaped to be inserted or embedded into the filter media. In an alternative embodiment, spring loaded clips or other connectors that are capable of direct attachment to filter media 12 may be used instead of hooks 26, 28.

Filter assembly 10 is installed on structure 18 by placing filter media 12 over air intake 16 and then connecting the opposite ends 30, 32 of filter media 12 by hooks 28, 26, respectively, of fasteners 14, such that filter media 12 and fasteners 14 together encircle structure 18 around its perimeter. Filter media 12 and fasteners 14 are sized such that elastic cord 20 must be stretched to connect ends 30, 32 of filter media 12, creating an elastic tension in a direction parallel to the longitudinal dimension of the cord that holds filter assembly 10 in place on structure 18. Thus, the installation of filter assembly 10 does not require modification of air intake 16 or structure 18, nor are any tools required for installation of the filter assembly.

Other types of fasteners 14 may be used to create tension in filter assembly 10 to hold the filter assembly on structure 18. In an alternative embodiment, fasteners 14 are provided with an adjustable strap instead of elastic cord 20. Once the ends 30, 32 of filter media 12 are connected around structure 18 by fasteners 14, the adjustable straps are then tightened to place filter media 12 and fasteners 14 under tension and hold filter assembly 10 on structure 18.

In a preferred embodiment, filter media 12 is made of a material strong enough to support hooks 26, 28 without tearing, such that the hooks may be attached at any point on the filter media. In an alternative embodiment, a tape 34 can be applied to the edges of filter media 12 to prevent hooks 26, 28 from tearing through the filter media and to prevent the edges of the filter media from fraying or unraveling. Tape 34 is a synthetic fabric that is attached to filter media 12 by sewing, adhesive or other means known in the art. In an alternative embodiment, grommets 36 for receiving hooks 26, 28 are mounted on tape 36 and inserted through filter media 12 to provide additional protection against tearing of the filter media.

In a preferred embodiment, filter media 12 is sufficiently flexible to conform to the shape of structure 18 and to be folded upon itself to permit a single size filter media to be adapted for use on structures of different size and shape. Filter assembly 10 is adapted for use on different sized and shaped air intakes 16 and structures 18 by folding the ends, top, or bottom of filter media 12 to reduce its size when in position over an air intake. This allows the user to change the size of filter media 12 on site without the need to pre-measure air intake 16 or use special tools. The folded filter media 12 is mounted over air intake 16 by attaching fasteners 14 to the newly formed folded ends (if the original ends are folded over) of the filter media. Thus, filter media 12 provides a readily adaptable, one-size-fits-all solution that may be used with many different sized and shaped air intakes 16 and structures 18, and there is no need to provide a different filter assembly 10 for each structure. For example, only 2 or 3 different sizes of filter media 12 would be needed to cover the variety of different residential and light commercial air conditioning and refrigeration equipment. In an alternative embodiment, filter media 12 is rigid or semi-rigid and is preformed to fit the shape of structure 16. However, such rigid filter media typically will be limited in use to specific applications and structures and could not readily be adapted for use on different air intakes 16 and structures 18.

Figure 3:
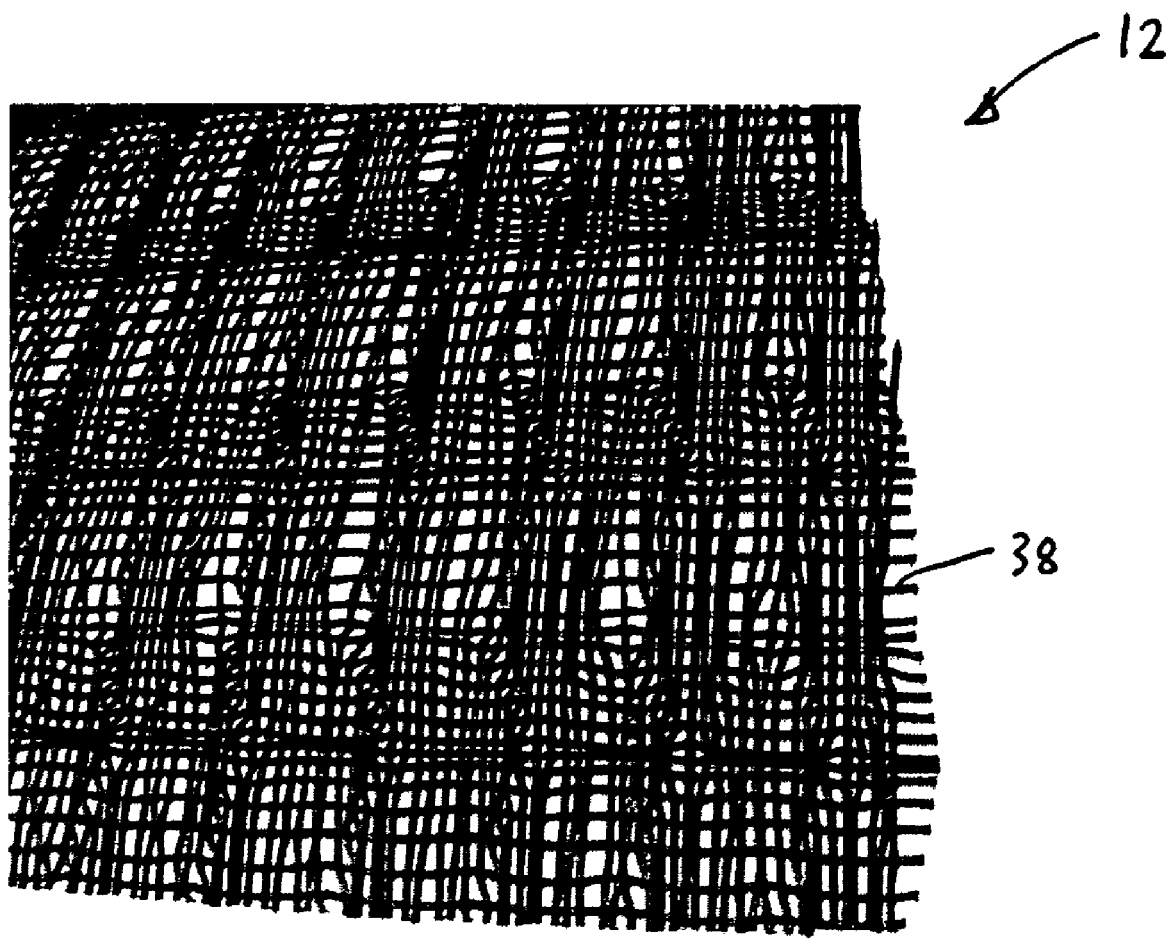
FIG. 3 is a detailed view of the woven fiber filter media of the filter assembly shown in FIG. 1.

In a preferred embodiment, filter media 12 is a flexible web made of washable, weather resistant synthetic fibers. The ability of filter media 12 to collect airborne particles is, in part, a function of the surface area of the fibers in the web. The surface area of the fibers in the web can be increased by weaving the fibers, most preferably in a 3-dimensional pattern. FIG. 3 shows a detail of filter media 12, with the synthetic fibers 38 woven in a 3-dimensional honeycomb pattern. Filter media 12 may be strengthened by bonding fibers 38 together at the points where they contact each other, by heating, ultrasonic welding, chemical binding or other means known in the art.

Figure 4:
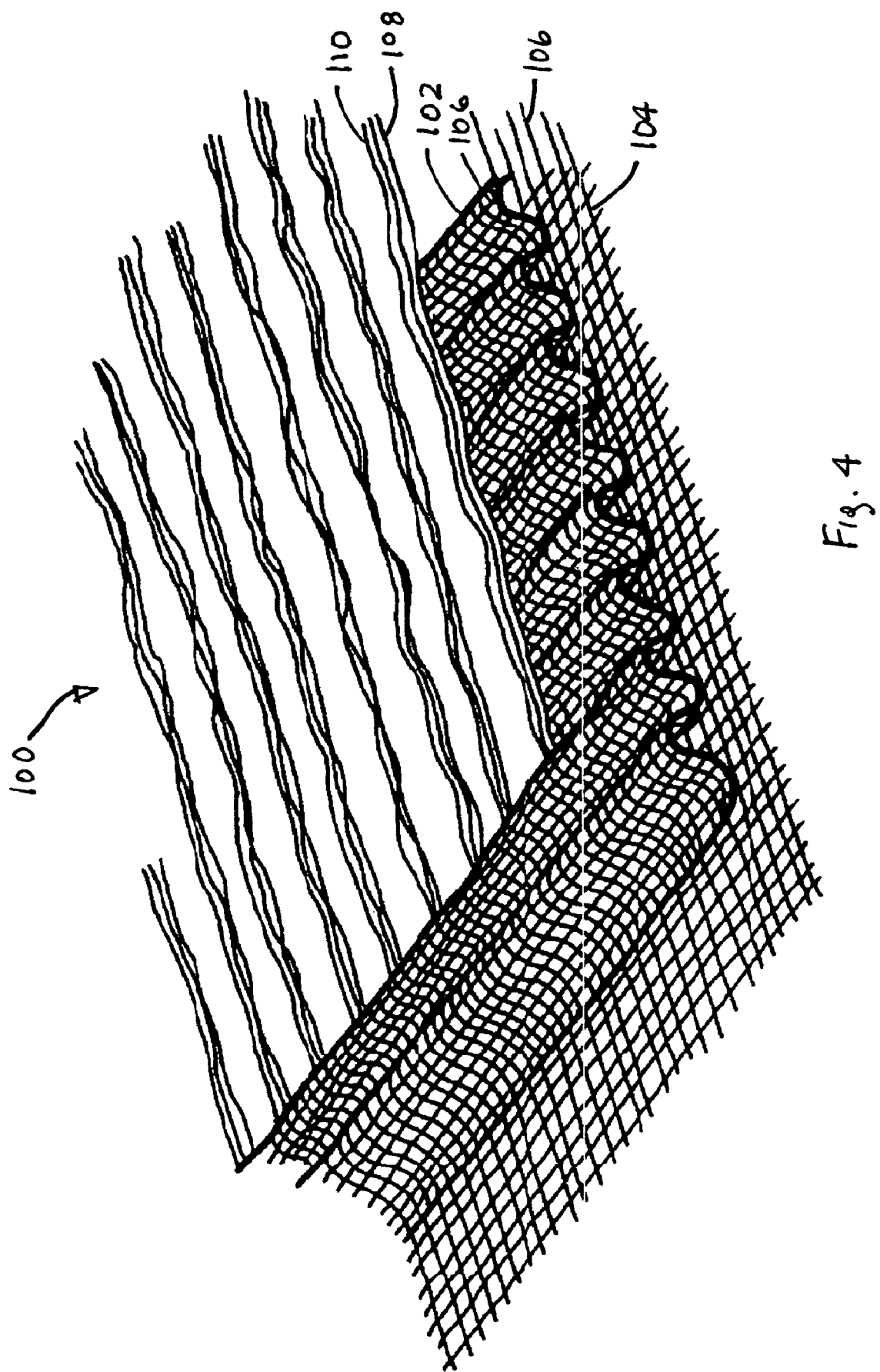
FIG. 4 is a detailed view of a filter media having multiple layers of woven synthetic fibers.

In an alternative embodiment, the filter media may be formed of multiple layers of woven synthetic fibers. FIG. 4 shows a detail of a filter media 100 having a corrugated layer 102 and a base layer 104, each made of woven synthetic fibers 106. A top layer 108 includes a plurality of threads 110 running transverse to the direction of the corrugations in layer 102. Corrugated layer 102 is woven together with base layer 104 and top layer 108.

Figure 5:
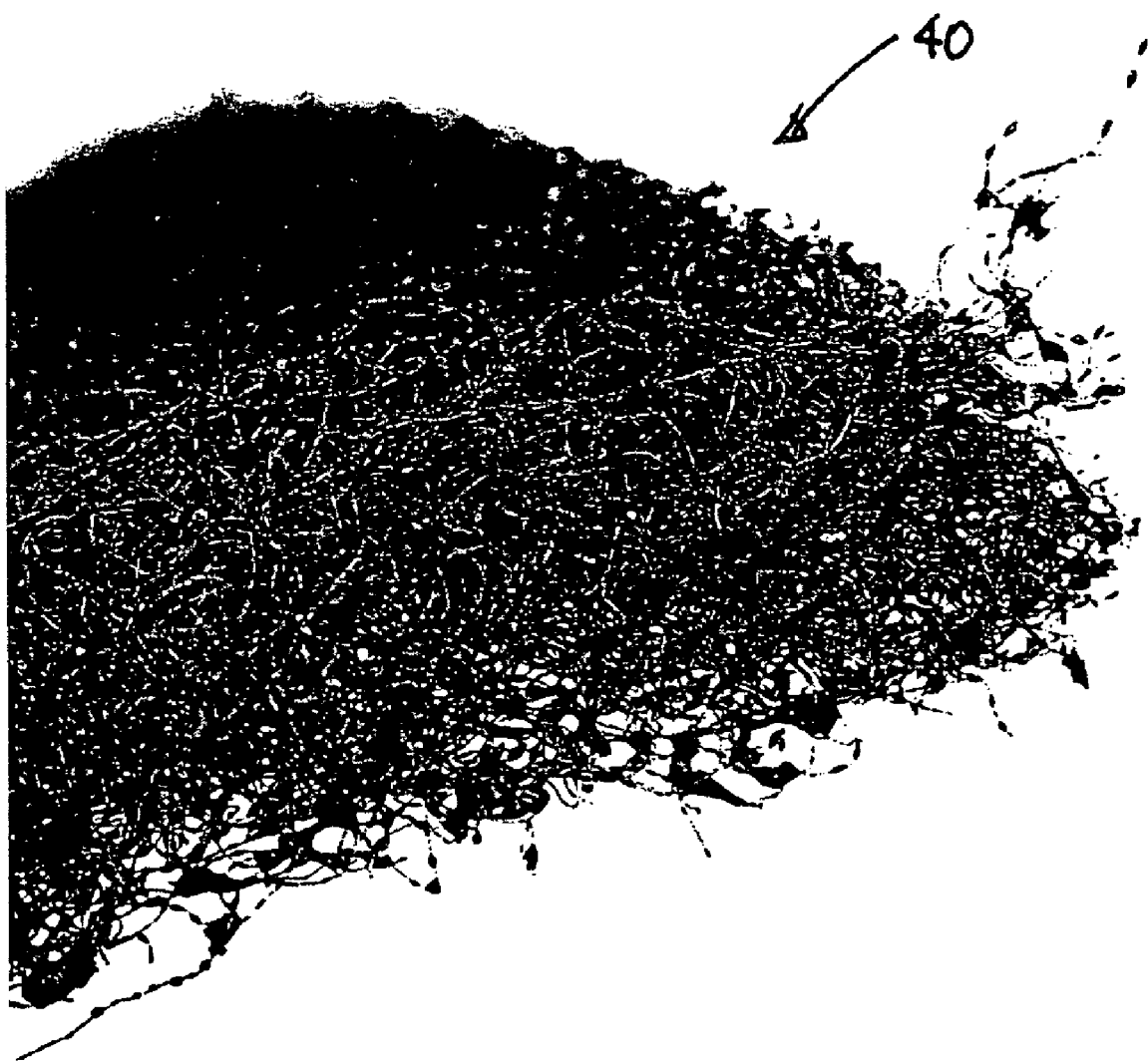
FIG. 5 is a detailed view of a filter media comprised of nonwoven fibers.

In a further alternative embodiment, the 3-dimensional web of fibers is a nonwoven mesh 40, such as an airlaid web of randomly dispersed synthetic fibers, as shown in FIG. 5. Nonwoven mesh 40 can be produced having greater thickness or loft than woven fibers, with a corresponding increase in total surface area of the fibers in the web. The fibers are bonded together at the points where they contact each other without significant reduction in loft. Filter media made of a nonwoven mesh are particularly advantageous in conditions of high humidity, where the increased loft provides greater surface area for condensation and removal of moisture or droplets of liquid entrained in the air flow, as well as precipitation of air borne minerals, such as salt. The ability to function as a condensation or precipitation media is particularly useful in coastal areas where humidity and proximity to saltwater can create corrosion problems.

The woven filter media 12 has a low resistance to airflow to avoid a reduction in pressure that may impair the operation of the heat exchanger or other equipment. In a preferred embodiment, filter media 12 produces an air pressure differential of about 0.05 inches or less, as measured by a water gauge (w.g.), and most preferably 0.02 inches or less. Folding filter media 12 does not substantially restrict the airflow.

Synthetic fibers 38 are made of various synthetic polymers, such as polypropylene, polyester, nylon or other synthetic polymers that are corrosion resistant and can withstand the extremes of humidity and temperature that are typical of outdoor use. Synthetic fibers 38 may be UV protected to prevent the degradation of synthetic polymers caused by sunlight. Synthetic fibers 38 may also be electrostatically charged to improve the capture and retention of dust and other small particles by filter media 12. For example, polypropylene fibers may be triboelectrically charged to attract airborne particles. Fibers 38 preferably have a smooth surface to facilitate cleaning.

It will be apparent to those skilled in the art that changes and modifications may be made in the embodiments illustrated herein, without departing from the spirit and the scope of the invention. Thus, the invention is not to be limited to the particular forms herein shown and described except insofar as indicated by the scope of the appended claims.

What is claimed is:

1. A filter assembly suitable for air filtration structures of various sizes and shapes, each such structure having an air intake, said filter assembly comprising:
   a filter media sized and shaped to substantially cover said air intake of a particular structure, said filter media having first and second ends; and
   an elastic fastener for joining said first and second ends of said filter media when said media is substantially covering an air intake;
   wherein said elastic fastener is attachable anywhere on said filter media so as to provide sufficient tension to said filter media to substantially conform said filter media to the size and shape of the air intake when said media is substantially covering an air intake.

2. The filter assembly of claim 1, wherein said filter media is a web of fibers made of a synthetic polymer selected from the group consisting of polypropylene, polyester and nylon and combinations thereof.

3. The filter assembly of claim 1, wherein said filter media is a web of fibers woven in a 3-dimensional pattern.

4. The filter assembly of claim 1, wherein said filter media produces an air pressure differential of about 0.05 inches w.g. or less.

5. The filter assembly of claim 1, wherein said filter media produces an air pressure differential of about 0.02 inches w.g. or less.

6. The filter assembly of claim 1, wherein said filter media is sufficiently flexible to be folded on itself.

7. The filter assembly of claim 1, wherein said filter media is made of a washable electrostatic material.

8. The filter assembly of claim 1, wherein said filter media produces an air pressure differential of about 0.02 inches w.g. or less.

9. A filter assembly suitable for air filtration structures of various sizes and shapes, each such structure having an air intake, said filter assembly comprising:
   a filter media sized and shaped to substantially cover said air intake of a particular structure, said filter media having first and second ends; and
   stretching means for attachment anywhere on said filter media when said media is substantially covering an air intake;
   wherein said filter media and said stretching means are under sufficient tension to substantially conform said filter media to the size and shape of the air intake when said media is substantially covering an air intake.

10. The filter assembly of claim 9 wherein said stretching means comprise an elastic fastener having first and second ends, and a connector at each of said first and second ends of said fastener.

11. The filter assembly of claim 10, wherein said connector is a hook, sized and shaped to attach to said filter media.

12. The filter assembly of claim 9, wherein said filter media is a web of fibers made of a synthetic polymer selected from the group consisting of polypropylene, polyester and nylon and combinations thereof.

13. The filter assembly of claim 9, wherein said filter media is a web of fibers woven in a 3-dimensional pattern.

14. The filter assembly of claim 9, wherein said filter media produces an air pressure differential of about 0.05 inches w.g. or less.

15. The filter assembly of claim 9, wherein said filter media produces an air pressure differential of about 0.02 inches w.g. or less.

16. The filter assembly of claim 9, wherein said filter media is sufficiently flexible to be folded on itself.

17. The filter assembly of claim 9, wherein said filter media is made of a washable electrostatic material.

* * * * *